April 22, 1924.

W. J. BULICK

CHICKEN PERCH

Filed Nov. 13, 1923

1,491,669

William J. Bulick, Inventor

By Geo. F. Kimmel, Attorney

Patented Apr. 22, 1924.

1,491,669

UNITED STATES PATENT OFFICE.

WILLIAM J. BULICK, OF READING, MINNESOTA.

CHICKEN PERCH.

Application filed November 13, 1923. Serial No. 674,532.

*To all whom it may concern:*

Be it known that I, WILLIAM J. BULICK, a citizen of the United States, residing at Reading, in the county of Nobles and State of Minnesota, have invented certain new and useful Improvements in Chicken Perches, of which the following is a specification.

This invention relates to bird or poultry perches, and has for its primary object the provision, in a manner as hereinafter set forth, of an improved perch so constructed as to automatically apply an oil and antiseptic to the feet of the bird roosting thereon, for the purpose of keeping the bird free from lice and in a clean and healthy condition.

Another object of the invention is the provision in a manner as hereinafter set forth, of a bird or poultry perch having means extending through the upper surface thereof for the application of an oil and antiseptic solution to the chickens perched thereon, and at the same time providing a perch having a soft or resilient material extending lengthwise thereof for contact with the feet of the chickens roosting thereupon.

A further object of the invention is the provision in a manner as hereinafter set forth, of a perch of light substantial construction, of few parts, easily and quickly assembled, strong, durable and inexpensive to manufacture.

The invention will be best understood from a consideration of the following detailed description taken in connection with the accompanying drawings forming part of this specification, with the understanding that various changes and modifications may be made in the same so long as such changes and modifications mark no material departure from the salient features of the invention as expressed in the appended claims.

In the drawings:—

Figure 1:
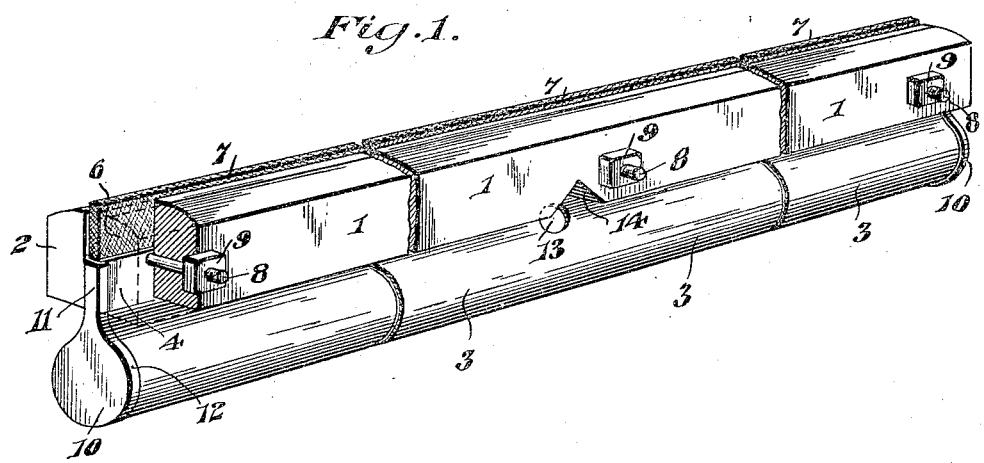
Figure 1 is a perspective view of the device embodying this invention, parts thereof being shown in section.
Figure 2:
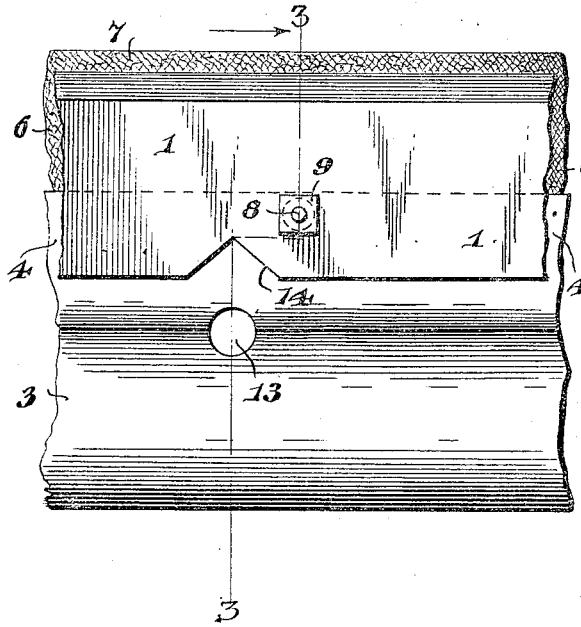
Fig. 2 is a side elevation of the central portion of the perch showing the refilling means.
Figure 3:
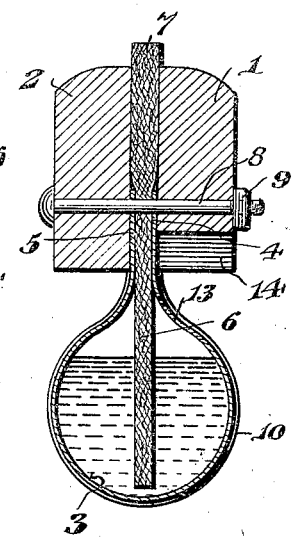
Fig. 3 is a sectional view taken on the line 3—3 of Fig. 2.

Referring now to the drawings in detail wherein like numerals of reference indicate corresponding parts throughout the several figures of the drawing, the perch is shown as constructed of a pair of parallel spaced bars 1 and 2, which bars may be of any desirable length to fit various styles of chicken houses. Centrally positioned beneath the two bars, is a reservoir tank 3, for the storage of any suitable oil and antiseptic, such as creosote and kerosene. This tank 3 is of substantially cylindrical cross section having a longitudinally extending passage therethrough, the two edges formed in the formation of this longitudinal passage being extended upwardly providing the spaced flanges 4 and 5. These spaced flanges extend upwardly between the spaced bar members 1 and 2 and carry between the walls thereof, a strip of wicking material of substantially the same length as the perch and the tank, this wick 6 being of a width sufficient to allow its lower edge to extend into the tank to a point adjacent the lower portion of the tank, and to allow its upper edge to extend beyond the top edge of the spaced bars 1 and 2, as indicated at 7. Extending transversely through the bars 1 and 2, and the upper portion of the flanges 4 and 5 of the tank, and also through the wick, are a series of bolt members 8, having their free ends secured at the outer side of said bar by the nut 9, thus securing the parts together in a manner which will allow their quick disassembly and reassembly without the use of any tools other than a small wrench.

The ends of the tank body are closed by means of a cap 10, which cap has an extension 11 upon one side to close the ends of the flanges 4 and 5, and further has a right angularly extending flange 12 which overlaps the end of the tank and the flanges above referred to.

The body of the tank 3 is provided with an aperture therethrough at 13, which aperture is located near the top part of the tank, and provision is made for easy access to said aperture for the filling of the tank with the antiseptic and oil, by providing an inverted V-shaped notch 14 in the lower edge of the bar 1, to allow for the insertion of a funnel or other filling device into the tank.

From the foregoing description, it may be seen that an improved chicken perch is provided by which oil and antiseptic may be applied to the chickens without the necessity of handling the same, and after the oil has been transmitted to the feet of the chickens, it will be further distributed over the body of the chicken by scratching.

What I claim is:—

1. A perch of the character described comprising a pair of spaced longitudinally extending parallel bars, a fluid receptacle comprising a substantially cylindrical body having a longitudinal passage through the wall thereof, the edges of said passage being extended upward to provide a pair of spaced flanges, said flanges being secured between said bars, and an absorbent material extending from said receptacle to a point above said bars.

2. A perch of the character described comprising a pair of spaced longitudinally extending parallel bars, a fluid receptacle comprising a substantially cylindrical body having a longitudinal passage through the wall thereof, the edges of said passage being extended upwardly to provide a pair of spaced flanges, said flanges being secured between said bars, an absorbent material extending from said receptacle to a point above said bars, and means extending transversely through said bars and spaced flanges for securing the same together.

3. A perch of the character described comprising a pair of spaced longitudinally extending parallel bars, a fluid receptacle comprising a substantially cylindrical body having a longitudinal passage through the wall thereof, the edges of said passage being extended upward to provide a pair of spaced flanges, said flanges being secured between said bars, and an absorbent material extending from said receptacle to a point above said bars, said receptacle having an aperture through the lower portion of one of the flanges to provide a refilling means.

4. A perch of the character described comprising a pair of spaced parallel longitudinally extending bars, a fluid receptacle comprising a substantially cylindrical body having a longitudinal passage through the wall thereof, the edges of said passage being extended upward to provide a pair of spaced flanges, said flanges being secured between said bars at the lower part thereof, and an absorbent material secured between the bars and extending from the receptacle to a point above said bars.

In testimony whereof, I affix my signature hereto.

WILLIAM J. BULICK.